United States Patent

Sevits

[11] Patent Number: 5,257,893
[45] Date of Patent: Nov. 2, 1993

[54] PORTABLE DISPENSER APPARATUS FOR BULK BAGS

[76] Inventor: Terry L. Sevits, Rte. 2, Greentop, Mo. 63546

[21] Appl. No.: 848,206
[22] Filed: Mar. 10, 1992
[51] Int. Cl.⁵ ............................................. B65G 67/24
[52] U.S. Cl. .................... 414/523; 222/105; 222/529; 414/526
[58] Field of Search ............ 414/523, 526, 326, 519, 414/406, 411, 414; 222/105, 185, 529

[56] References Cited

U.S. PATENT DOCUMENTS

| | | | |
|---|---|---|---|
| 1,317,577 | 9/1919 | Hoops | 222/608 |
| 1,398,649 | 11/1921 | Richards | 414/523 X |
| 2,405,727 | 8/1946 | Aaberg | 414/526 |
| 3,460,698 | 8/1969 | Harris | 414/526 X |
| 3,575,306 | 4/1971 | Obermeyer et al. | 414/523 |
| 3,785,534 | 1/1974 | Smith | 222/460 |
| 3,874,530 | 4/1975 | Purdy | 414/526 |
| 4,218,169 | 4/1980 | Arends | 414/523 |
| 4,306,668 | 12/1981 | Love | 222/105 |
| 4,398,859 | 8/1983 | Ball | 414/523 |
| 4,557,400 | 12/1985 | Clarke | 222/105 |
| 4,722,655 | 2/1988 | Bonerb | 222/105 X |
| 4,817,824 | 4/1989 | LaFleur et al. | 222/105 |
| 4,878,600 | 11/1989 | Derby | 222/105 |
| 4,881,665 | 11/1989 | McGuire | 222/181 |
| 4,917,266 | 4/1990 | Kellenberger et al. | 222/105 |
| 4,923,358 | 5/1990 | Van Mill | 414/519 |
| 5,033,706 | 7/1991 | Poulton | 222/105 X |
| 5,069,596 | 12/1991 | Mueller et al. | 414/607 |

FOREIGN PATENT DOCUMENTS 2342938 9/1977 France ............... 414/526

Primary Examiner—David A. Bucci
Attorney, Agent, or Firm—Grace J. Fishel

[57] ABSTRACT

A portable dispenser apparatus for bulk bags is mounted on a longitudinally extending frame that is suitable for mounting on a trailer or a truck. The bags are mounted on a platform with an opening under which is attached a chute and an auger. The platform is supported on the frame such that the chute and auger fit under the platform as close as possible to the ground and, in a preferred form, so that the auger can be pivoted and rotated. Material flows under force of gravity from the bag, through the opening, down the chute and into the auger from which it is supplied to a planter, grinder mixer, spreader and so forth. When the bag has a spout a cinch or the like is provided to check the flow.

10 Claims, 2 Drawing Sheets

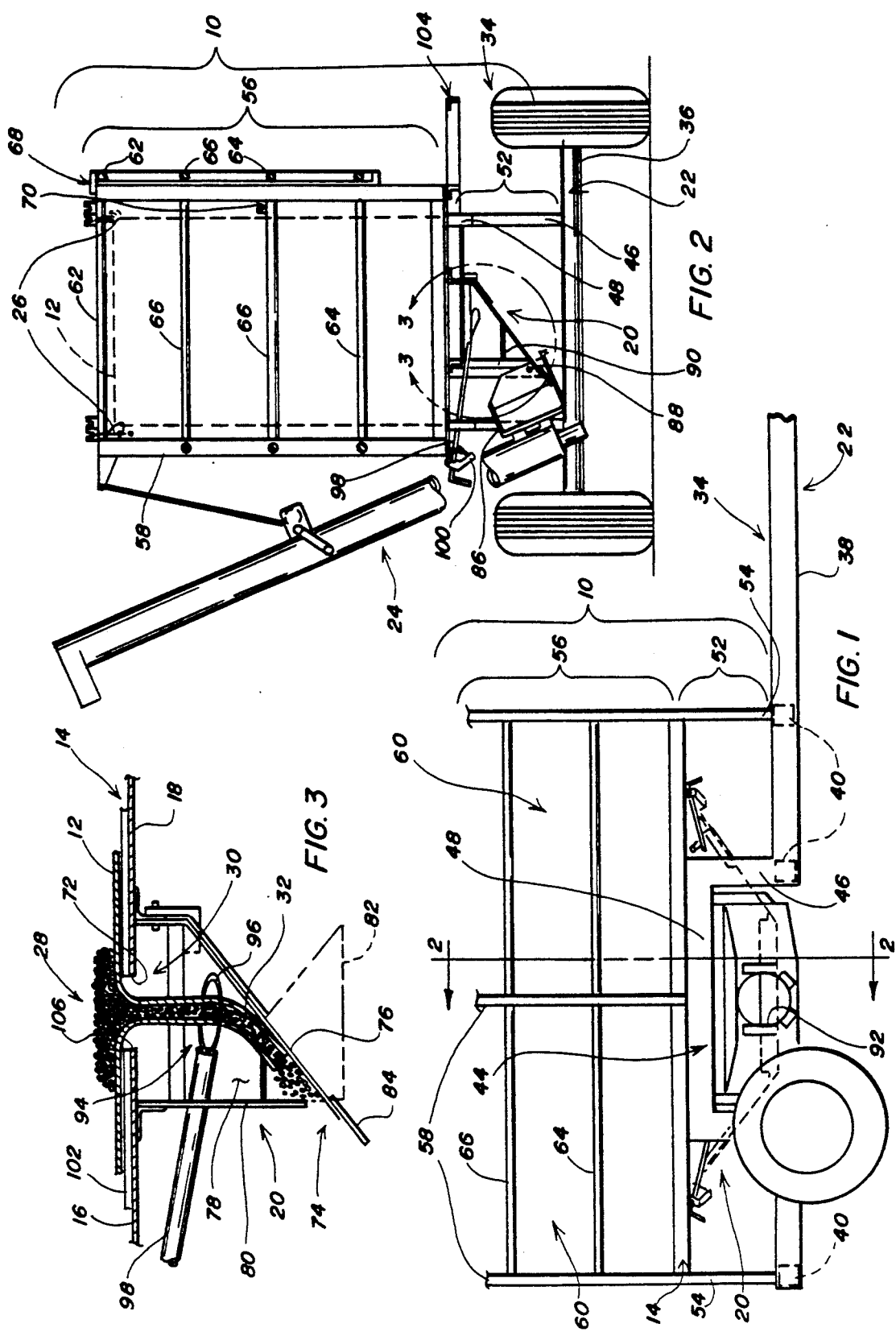

PORTABLE DISPENSER APPARATUS FOR BULK BAGS

The present invention relates to a portable dispenser apparatus for handling and discharging flowable materials from bulk bags.

BACKGROUND OF THE INVENTION

Bulk bags are used in industry for the storage and transportation of flowable materials. Recently bulk bags have come into use in agriculture for the storage and transportation of seed grains, feeds, fertilizers and the like. Such bulk bags weigh up to several thousand pounds depending on the density of the material with which they are filled. They offer advantages of economy to the dealer and to the farmer but from the farmer's standpoint they are very difficult to handle.

Many farmers have utility trailers, grain trailers and so forth, none of which however, are particularly adapted to the problems of handling and discharging seed grain, feeds or fertilizer from bulk bags into a planter, grinder mixer or spreader. When bulk bags are used at all, they are lifted with a fork lift and the contents dumped into a grain trailer which is then used to auger the material where it is needed. Other farmers use a fork lift and hold the bulk bag over the planter, grinder mixer or spreader into which the contents are dumped directly. Neither technique is entirely satisfactory. The first procedure requires transferring the contents of the bag twice and the second is dangerous since it frequently requires a man to stand under the bulk bag as it is supported by the fork lift.

SUMMARY OF THE INVENTION

It is an important object of the present invention to provide a portable dispenser apparatus for bulk bags that is particularly adapted for agricultural use. Another object is to provide an apparatus that can be mounted on a frame of a trailer and run off a power auger used for other purposes. Still another object is to provide a portable dispenser apparatus which can be mounted on a trailer that is used for no other purpose and is attached to a dedicated auger. Other objects and features of the invention will be in part apparent and in part pointed out.

A portable dispenser apparatus in accordance with the present invention is for use with bulk bags containing a flowable material in conjunction with a longitudinally extending frame that is suitable for mounting on a trailer or truck and an auger. The bulk bags have a means in the bottom of the bag for emptying the bag. The apparatus has a generally horizontally-oriented platform with an upper and lower side and a chute is attached to the lower side of the platform. The platform is mounted on its lower side to the frame. The means for mounting the platform to the frame is a first vertically-oriented support structure. This structure elevates the platform to a height sufficient that there is room for the chute and the auger under the platform. The platform has an opening connecting its upper and lower sides. The platform also has a second vertically-oriented support structure mounted on its upper side for holding the bag in a position on the platform such that its means for emptying the bag are in registry with the opening in the platform. The chute is positioned below the opening in the platform. A discharge end of the chute is flowably connected to the auger. Material in the bulk bag is carried by the apparatus and flows under force of gravity into the auger where it can be distributed as needed.

The invention summarized above comprises the constructions hereinafter described, the scope of the invention being indicated by the subjoined claims.

BRIEF DESCRIPTION OF THE DRAWINGS

In the accompanying drawings, in which one of various possible embodiments of the invention is illustrated, corresponding reference characters refer to corresponding parts throughout the several views of the drawings and in which:

FIG. 1 is a side elevation view of a portable dispenser apparatus mounted on a frame which is part of a trailer;

FIG. 2 is a sectional view taken along line 2—2 in FIG. 1 showing the apparatus connected to an auger through an auger hopper;

FIG. 3 is an enlarged detail taken along line 3—3 in FIG. 2; and,

DETAILED DESCRIPTION OF THE INVENTION

Figure 4:
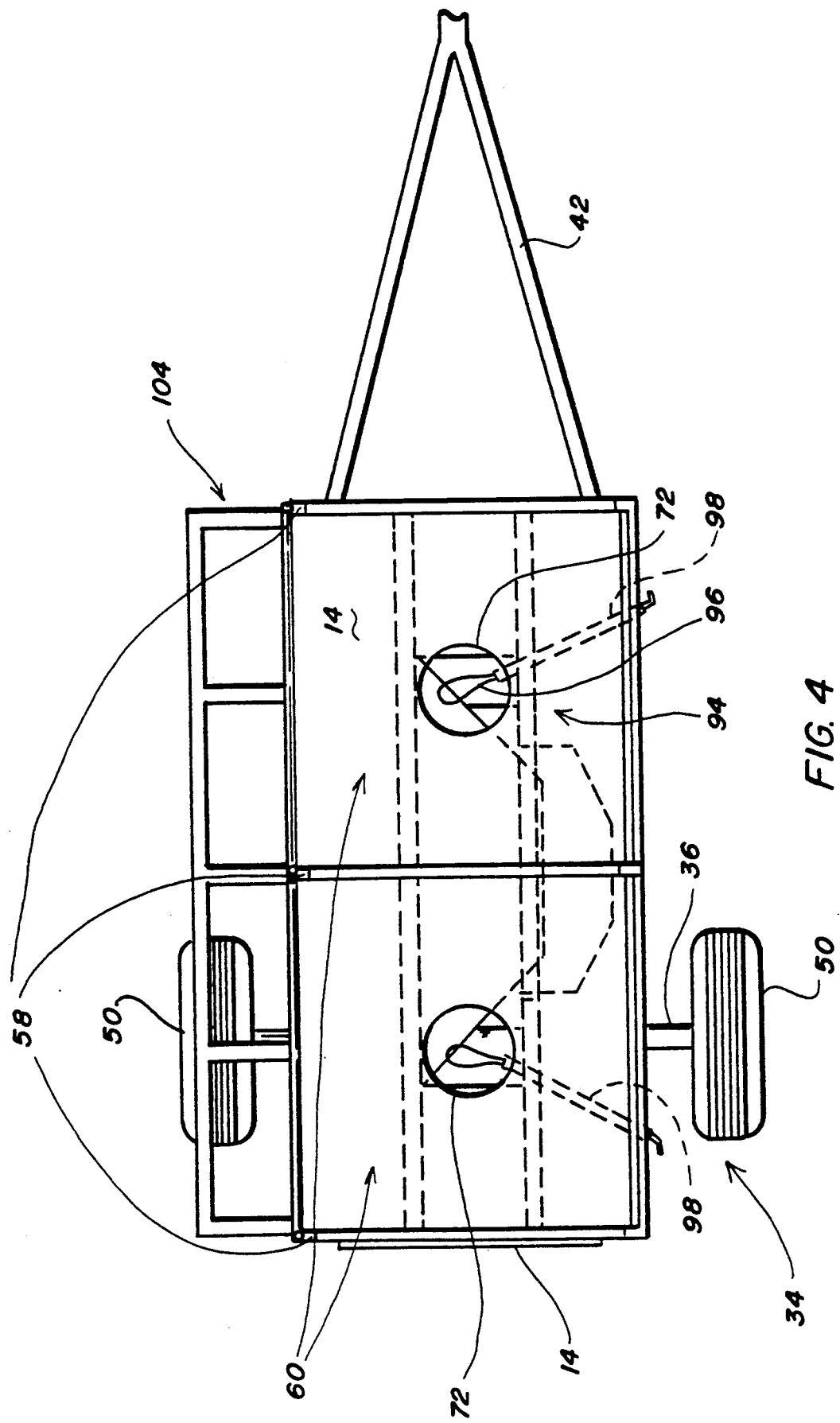
FIG. 4 is a plan view of the portable dispenser apparatus as viewed in FIG. 1.

Referring to the drawings more particularly by reference character, reference numeral 10 refers to a portable dispenser apparatus 10 in accordance with the present invention for use with a bulk bag 12. As more particularly described below, apparatus 10 has a generally horizontally-oriented platform 14 with an upper side 16 and a lower side 18. A chute 20 is attached to lower side 18 of the platform. Apparatus 10 is designed for use in conjunction with a longitudinally extending frame 22 that is suitable for mounting on a trailer or truck and an auger 24.

Bulk bags 12 for use with apparatus 10 are constructed from a high strength sheet material. Standard bulk bags are either square in plan and rectangular in elevation or cylindrical but other shapes are possible and may be used with the present invention. One of the advantages of cubically shaped bulk bags over other shapes is that the bags can be stacked side by side so as to take up a minimum of storage space. Bulk bags 12 are heavy when they are full. Because of their great weight, fork lift machines are usually used to carry them from place to place and to hold the them while the contents are being discharged. Most bulk bags 12 are, therefore, designed to be carried with a fork lift with slings 26 in the upper four corners for that purpose.

Bulk bags 12 can be filled with a flowable material 28 such seed grain, feed, fertilizer and the like. While apparatus 10 is particularly adapted for agricultural use, it will be understood, however, that it can be used for industrial purposes. Hence flowable material 28 can be any free-flowing solid (e. g., granular), liquid or semi-liquid which can be advantageously stored in bulk such as raw, processed and semi-processed foods, building materials such as cement, chemicals and so forth.

A means for emptying bulk bag 12 (hereinafter referred to as emptying means 30) is provided in the bottom of the bag. In a preferred form, emptying means 30 is a preformed spout 32 which is pushed up into the bag and secured by a string tie (not shown) when the bag is filled. When the string tie is released, spout 32 emerges from the bottom of the bag as shown in FIG. 3. A second string tie (not shown) is usually tied around the neck of spout 32. When the second string tie is removed, flow is established through spout 32. Bulk bags 12 with spouts 32 are preferred for use with apparatus 10 because flow can be more readily controlled. This does not rule the possibility, however, that emptying means 30 can take other forms, the most simple of which is a slit formed by simply cutting the bottom of the bag with a knife.

As shown in FIG. 1, frame 22 is part of a trailer 34. Trailer 34 has a single axle 36 and frame 22 comprises a pair of elongate side members 38 joined together by cross-members 40. Side members 38 converge at the forward end of trailer 34 to form a tongue 42 by which the trailer can be towed. With continuing reference to FIG. 1, a upwardly directed gooseneck 44 is formed in side members 38 forward of axle 36. Gooseneck 44 is U-shaped with two upright members 46 joined by a horizontal member 48. It will be readily apparent that trailer 34 can have more than one axle. For example, the usual bed can be removed or never installed on an ordinary four-wheel trailer and apparatus 10 on frame 22 installed in its place. In other instances frame 22 can be mounted on the bed of the truck, in which case the function of wheels 50 on axle 36 are performed by the wheels of the truck and axle 36 can be eliminated along with tongue 42.

Platform 14 is mounted along its lower side 18 on frame 22 by a first vertically-oriented support structure 52 for elevating the platform to a height sufficient that chute 20 and auger 24 are fitted under platform 14 as close to the ground as possible to lower the center of gravity. When apparatus 10 is trailer mounted, chute 20 and auger 24 may hang below the bottom of frame 22 so long as they are hung high enough that they clear the ground. As shown in FIG. 1, first vertically-oriented support structure 52 is formed by gooseneck 44 in combination with upright supports 54 on opposite ends of platform 14. Platform 14 is reversible end to end on the first vertically-oriented support structure such that auger 24 can be attached on either side of trailer 34.

As shown in FIGS. 1 and 2, platform 14 has a second vertically oriented support structure 56 mounted along its upper side 16. Second vertically oriented support structure 56 is preferably shaped to conform with the shape of bulk bag 12. Second vertically oriented support structure 56 is not necessarily square in plan and rectangular in elevation, as shown in the drawings, although that is the preferred shape. As illustrated, apparatus 10 is a two-bag unit and second vertically oriented support structure 56 comprises six upright supports 58 forming two adjoining, open ended square cages 60. Along three sides of each cage 60, upright supports 58 are connected by upper cross members 62 and lower cross members 64 with intermediate cross members 66 provided between. On the remaining side of each cage 60, upright supports 58 are joined by a gate 68 (also with upper, lower and intermediate cross members 62, 64 and 66 respectively) pivoted on one of upright supports 58 and chained by a latch 70 on another upright support 58. As illustrated, gates 68 on adjoining cages 60 are center opening and chained to the same upright support 58. A latch 70 is provided on upright supports 58 at the upper corner of each cage 60 for chaining the slings 26 of bulk bag 12.

Platform 14 has an opening 72 shown in FIGS. 3 and 4 connecting its upper and lower sides 16, 18, respectively. Opening 72 is located in platform 14 such that when bulk bag 12 is held in vertically oriented support structure 56, emptying means 30 are in registry with the opening in the platform.

Chute 20 is positioned below opening 72 and has a discharge end 74 connected to auger 24. As best seen in FIGS. 2 and 3, chute 20 has a sloped sidewall 76 sloped downwardly and outwardly towards one side of frame 22. Sloped sidewall 76 together with end walls 78 and vertical sidewall 80 are attached to the underside of platform 14 and form chute 20. Sloped sidewall 76 is V-shaped and is positioned below opening 72. End walls 78 have a door 82 through which opening 72 can be accessed. Discharge end 74 of chute 20 is formed by sloped sidewall 76 which is gapped from and passes under vertical sidewall 80. A rubber boot 84 is attached to discharge end 74.

With continuing reference to FIGS. 2 and 3, discharge end 74 mates along boot 84 to a hopper 86 attached to auger 24. In the form illustrated, auger is attached by a pivot 88 to an upright support 90 connected to platform 14. Auger 24 is attached to auger hopper 86 on an annular bearing 92 which allows the auger to rotate so that it can be folded alongside of frame 22.

Means for checking the flow of material 28 through spout 32 (hereinafter checking means 94) are provided. As illustrated, checking means 94 are formed by a loop 96 of cable, one end of which is attached to a handle 98. Loop 96 is positioned below opening 72 and around spout 32, about which it can be cinched by pulling on the end of handle 98. In the drawings, handle 98 is attached to lower side 18 of platform 14 and a spring catch 100 holds handle 98 in a selected position.

In use, apparatus 10 is mounted on frame 22 which can be either part of a trailer or loaded on a truck. Apparatus 10 on frame 22 is taken to a source of supply for bulk bags 12 filled with flowable material 28 such as seed grain, feed, fertilizer and so forth. Gates 68 of cages 60 are opened and bulk bags 12 lifted onto upper side 16 of platform 14. This can be accomplished with a fork lift by catching slings 26 by the tines of the fork. In the event that the fork lift cannot lift bulk bags 12 high enough, they may be mounted on a pallet 102. Pallet 102 can then be slid onto upper side 16 of platform 14. For this purpose, it may be advantageous to provide a catwalk 104 which is cantilevered to platform 4 upon which the bulk bag on pallet 102 can be lifted and then pushed the rest of the way into cage 60 with the fork lift. An aperture 106 must be provided in pallet 102 through which spout 32 passes. Once bulk bags 12 have been loaded, gates 68 are chained shut with latches 70 and slings 26 chained with latches 70 at the top corners of cages 60. Slings 26 stabilize bulk bag 12 for travel and hold the bag up while it is being emptied. With auger 24 raised on pivot 88 and rotated on bearing 92 such that it lays close to second vertical support structure 56, apparatus 10 can be taken where it is needed.

When it is time to use material 28, emptying means 30 is activated. This is accomplished by opening door 82 in end wall 78 so that the bottom of bulk bag 12 can be accessed. If the bulk bag has a spout 32, the string tie holding in the spout is pulled allowing spout 32 to fall through opening 72 into loop 96. Handle 98 is pulled cinching loop 96 around the neck of spout 32 and the tie around the neck is loosened. With hopper 86 of auger 24 aligned with discharge end 74 of chute 20, hopper 86 is pivoted on pivot 88 and auger 24 rotated on bearing 92 so that the end of the auger is directed into the planter, mixer grinder, spreader or the like where the material is to be delivered. Auger 24 is started and handle 98 pushed releasing loop 96 around the neck of spout 32.

Material 28 falls by force of gravity out of bulk bags 12 into auger 24 through hopper 86. Flow can be interrupted simply by pulling handle 98 and cinching spout 32 closed.

In view of the above, it will be seen that the several objects of the invention are achieved and other advantageous results attained. As various changes could be made in the above constructions without departing from the scope of the invention, it is intended that all matter contained in the above description or shown in the accompanying drawings shall be interpreted as illustrative and not in a limiting sense.

We claim:

1. A portable dispenser apparatus for a bulk bag containing a flowable material and having a bottom, said bulk bag having a means in the bottom of the bag for emptying the bag, said dispenser apparatus for use in conjunction with a frame and an auger, comprising:

a generally horizontally-oriented platform with an upper and lower side and a chute attached to the lower side of the platform, said platform mounted on its lower side to the frame by a first vertically-oriented support structure for elevating the platform to a height sufficient that there is room for the chute and auger under the platform, said platform having an opening connecting its upper and lower side, and said platform having a second vertically-oriented support structure mounted on the upper side of the platform for holding the bag in a position on the platform such that its means for emptying the bag are in registry with the opening in the platform, said platform stationary with respect to said first and second vertically-oriented support structures, said chute positioned below the opening in the platform and having a discharge end flowably connected to the auger whereby the material in the bulk bag flows under force of gravity into the auger.

2. The apparatus of claim 1 wherein the frame is longitudinally extending and has a width suitable for mounting on a trailer or truck.

3. The apparatus of claim 2 wherein the emptying means in the bottom of the bulk bag is a spout on which a means for checking the flow of material through the spout is installed.

4. A portable dispenser apparatus for a bulk bag containing a flowable material and having a bottom, said bulk bag having a spout in the bottom of the bag for emptying the bag, said dispenser apparatus for use in conjunction with a frame of a trailer with wheels for travel over the ground and an auger, comprising:

a generally horizontally-oriented platform with an upper and lower side and a chute attached to the lower side of the platform, said platform having a first vertically-oriented support structure attached to the lower side of the platform for mounting the platform on the trailer frame at a height sufficient that the chute and auger clear the ground, said platform having an opening connecting its upper and lower side, and said platform having a second vertically-oriented support structure mounted on the upper side of the platform for holding the bag in a position on the platform such that the spout passes through the opening in the platform, said chute having a sidewall sloped downwardly and outwardly towards one side of the platform, said sidewall positioned below the opening in the platform and having a discharge end flowably connected to the auger whereby the material in the bulk bag flows under force of gravity into the auger.

5. The apparatus of claim 4 wherein the emptying means in the bottom of the bulk bag is a spout on which a means for checking the flow of material through the spout is installed.

6. The apparatus of claim 5 wherein the frame has a gooseneck and the first vertically-oriented support structure is formed in part by the gooseneck whereby the chute and auger can be hung above the bottom of the frame but as low as possible to the ground to lower the center of gravity.

7. A portable dispenser apparatus for a bulk bag containing a flowable material and having a bottom, said bulk bag having a spout in the bottom of the bag for emptying the bag, said dispenser apparatus for use in conjunction with a frame of a trailer with wheels for travel over the ground and an auger, said frame having a gooseneck, said auger having an attached hopper and mounted by a bearing such that it can rotate on the hopper, comprising:

a generally horizontal-oriented platform with an upper and lower side and a chute attached to the lower side of the platform, said platform having a first vertically-oriented support structure attached to the lower side of the platform for mounting the platform on the trailer frame, said first vertically-oriented support structure formed in part by the gooseneck of the frame whereby the chute and the auger can be hung under the top of the gooseneck as close as possible to the ground to lower the center of gravity, said platform having an opening connecting its upper and lower side, and said platform having a second vertically-oriented support structure mounted on the upper side of the platform for holding the bag in a position on the platform such that the spout passes through the opening in the platform, said chute having a sidewall sloped downwardly and outwardly towards one side of the platform, said sidewall positioned below the opening in the platform and having a discharge end flowably connected to the auger whereby the material in the bulk bag flows under force of gravity into the auger.

8. The apparatus of claim 7 wherein a means for checking the flow of material through the spout is provided and wherein an end wall is attached to the sloped sidewall, said end wall having a door through which the opening in the platform and the bottom of the bulk bag can be accessed.

9. The apparatus of claim 8 wherein the hopper is pivoted to a hopper support attached to the underside or the platform, whereby the auger can be raised and lowered and pivoted on bearing while suspending under the gooseneck.

10. A portable dispenser apparatus for a bulk bag containing a flowable material and having a bottom, said bulk bag having a spout in the bottom of the bag for emptying the bag, said dispenser apparatus for use in conjunction with an auger comprising:

a trailer with wheels for travel over the ground and a frame, a generally horizontally-oriented platform with an upper and lower side and a chute attached to the lower side of the platform, said platform having a first vertically-oriented support structure attached to the lower side of the platform for mounting the platform on the trailer frame at a height sufficient that the chute and auger clear the ground, said platform having an opening connecting its upper and lower side, and said platform having a second vertically-oriented support structure mounted on the upper side of the platform for holding the bag in a position on the platform such that the spout passes through the opening in the platform, said chute having a sidewall sloped downwardly and outwardly towards one side of the platform, said sidewall positioned below the opening in the platform and having a discharge end flowably connected to the auger whereby the material in the bulk bag flows under force of gravity into the auger.

* * * * *